L. KIRSCH.
GATE LATCH.
APPLICATION FILED SEPT. 8, 1916.
1,233,674.
Patented July 17, 1917.
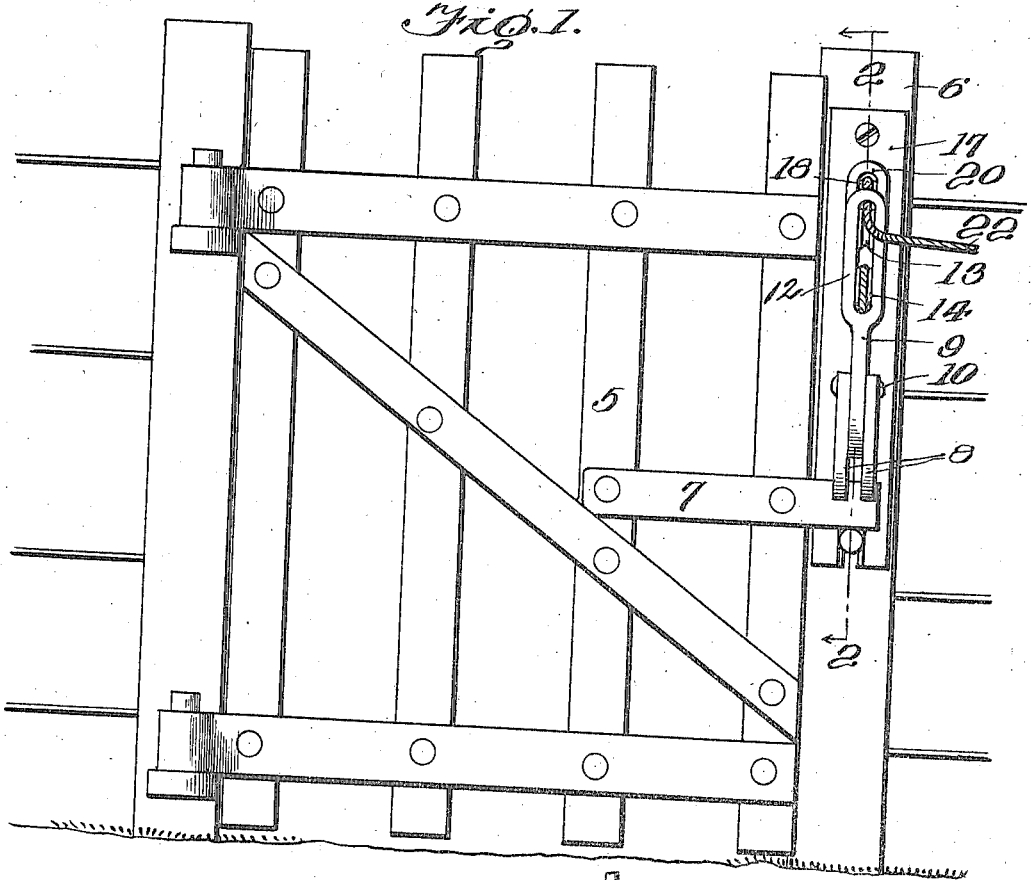
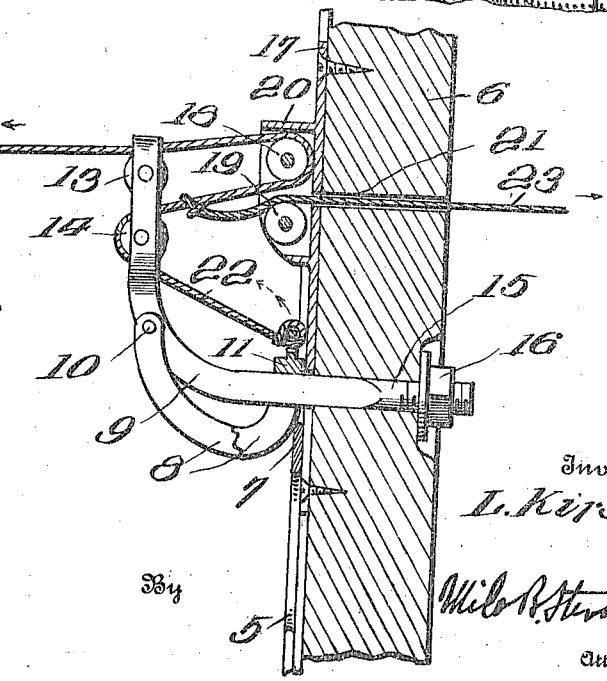
Inventor
L. Kirsch
By
Attorneys

UNITED STATES PATENT OFFICE.

LOUIS KIRSCH, OF POLAR, WISCONSIN.

GATE-LATCH.

1,233,674.

Specification of Letters Patent.

Patented July 17, 1917.

Application filed September 8, 1916. Serial No. 119,053.

*To all whom it may concern:*

Be it known that I, LOUIS KIRSCH, a citizen of the United States, residing at Polar, in the county of Langlade and State of Wisconsin, have invented new and useful Improvements in Gate-Latches, of which the following is a specification.

The latch which is the subject matter of the present application for patent is designed for use in connection with fence, barn, stable and other doors, and the invention has for its object to provide a simple, efficient and easily operated latch of this kind, together with a novel and improved means whereby the gate may be unlatched from a distance.

The object stated is attained by means of a novel combination and arrangement of parts to be hereinafter described and claimed, and in order that the same may be better understood, reference is had to the accompanying drawing forming a part of this specification.

In the drawing,

Figure 1 is an elevation of a gate provided with my improved latch, and

Fig. 2 is a vertical section on the line 2—2 of Fig. 1.

Referring specifically to the drawing, 5 denotes an ordinary gate which closes against a post 6. The gate has a fixed, horizontal latch bar 7, and the post 6 carries a keeper for said latch bar. This keeper comprises two parallel curved bars 8 straddling an arm 9 extending outward from the face of the post 6. The bars 8 are pivoted at one end to the arm 9, as indicated at 10, and their other ends have a connecting portion 11. The bars normally extend downward from the arm 9 and their connecting portion 11 seats on top of the arm, thereby limiting the extent of the downward movement of the bars. When the gate 5 is swung closed, the bar 7 strikes the depending curved portion of the bars 8, whereupon they automatically lift and let the bar 7 pass, and then drop down in front of said bar. The bar 7 is now held behind the bars 8, and the gate is held closed, and before the gate can be opened, the bars 8 must be lifted clear of the bar 7. The curvature at the rear edge of the bars 8 is very small so that they cannot swing upward when the bar 7 is pressed outward thereagainst by a pull on the gate. The gate is therefore held securely closed and it cannot be opened until the bars 8 are lifted.

The following means are provided for lifting the bars 8 to release the bar 7 and allow the gate to be opened.

The outer end of the arm 9 has an upstanding bifurcated portion 12 in which are journaled vertically spaced guide pulleys 13 and 14, respectively. The arm 9 has a straight shank 15 passing through the post 6, and secured thereto by a nut 16 on the back of the post. The side of the post from which the arm 9 extends is faced with a metal plate 17 having at its upper end, above said arm, two vertically spaced guide pulleys 18 and 19, respectively. These two guide pulleys are inclosed in a housing 20 on the plate 17, said housing being open in front, and the plate 17 and the post 6, in line with the bottom pulley 19 having a hole 21 opening through the rear face of the post. To the connected end 11 of the bars 8 is fastened a line 22 which passes forward and upward to the bottom pulley 14, and after passing over said pulley, the line extends rearward and over the top pulley 18, and then forward over the top pulley 13. It will therefore be evident that a pull on the line 22 will lift the bars 8 to release the bar 7 and enable the gate 5 to be opened. In order that the bars 8 may also be lifted from the rear of the post 6, a line 23 is connected to the line 22 where it passes between the pulleys 14 and 18, and this line passes rearward over the bottom pulley 19 and through the hole 21 in the post. A pull on the line 22 also lifts the bars 8 for the purpose stated. The two operating lines may be carried any distance from the gate so that the latter may be unlatched from a remote location.

I claim:—

1. A latch comprising a supporting arm having an upstanding bifurcated portion, a guide pulley carried by said upstanding portion between the branches thereof, a support for the arm, a guide pulley on the support, said support having an opening, a keeper bar pivoted at one end to the supporting arm and extending with a downward curve therefrom, the other end of said bar engaging the top of the arm, a hauling line connected to the last-mentioned end of the keeper bar and passing forward and upward to the first-mentioned guide pulley, and over the same and across to the second-mentioned pulley, and a second hauling line connected to the first hauling line at a point between the aforesaid guide pulleys, said second hauling line passing rearward through the aforesaid opening in the support in the opposite direction from the first-mentioned hauling line.

2. A latch comprising a supporting arm having an upstanding portion, a guide pulley carried by said upstanding portion, a support for the arm, a guide pulley on the support, said support having an opening, a pair of parallel keeper bars below the guide pulleys straddling the support and pivoted at one end to the supporting arm from which latter they extend curved downward, the other ends of the bars having a connecting portion engageable with the top of the supporting arm, a hauling line connected to said connecting portion and passing forward and upward to the first-mentioned guide pulley, and over the same and across to the second-mentioned pulley, and a second hauling line connected to the first hauling line at a point between the aforesaid guide pulleys, said second hauling line passing rearward through the aforesaid opening in the support.

In testimony whereof I affix my signature.

LOUIE KIRSCH.

Copies of this patent may be obtained for five cents each, by addressing the "Commissioner of Patents, Washington, D. C."